US009121972B2

(12) United States Patent
Jaaskelainen

(10) Patent No.: US 9,121,972 B2
(45) Date of Patent: Sep. 1, 2015

(54) IN-SITU SYSTEM CALIBRATION

(71) Applicant: Halliburton Energy Services, Houston, TX (US)

(72) Inventor: Mikko Jaaskelainen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 351 days.

(21) Appl. No.: 13/751,056

(22) Filed: Jan. 26, 2013

(65) Prior Publication Data

US 2014/0208821 A1 Jul. 31, 2014

(51) Int. Cl.
*G01V 13/00* (2006.01)
*G01K 15/00* (2006.01)
*G01K 11/32* (2006.01)

(52) U.S. Cl.
CPC .............. *G01V 13/00* (2013.01); *G01K 11/32* (2013.01); *G01K 15/005* (2013.01)

(58) Field of Classification Search
CPC .................. E21B 47/06; G01V 13/00
USPC .................. 73/1.57, 152.51–152.53
See application file for complete search history.

(56) References Cited

U.S. PATENT DOCUMENTS

| | | | |
|---|---|---|---|
| 5,775,429 A * | 7/1998 | Arizmendi et al. ........... 166/387 |
| 6,041,858 A * | 3/2000 | Arizmendi ..................... 166/187 |
| 6,234,257 B1 * | 5/2001 | Ciglenec et al. ............... 175/50 |
| 6,691,779 B1 * | 2/2004 | Sezginer et al. ......... 166/250.01 |
| 7,744,292 B2 | 6/2010 | Stoesz |
| 2002/0149498 A1 * | 10/2002 | Tabanou et al. ............ 340/854.5 |
| 2002/0171560 A1 * | 11/2002 | Ciglenec et al. ........... 340/853.1 |
| 2002/0195247 A1 * | 12/2002 | Ciglenec et al. ......... 166/250.11 |
| 2005/0217848 A1 * | 10/2005 | Edwards et al. .............. 166/285 |
| 2012/0279702 A1 * | 11/2012 | Bedouet et al. ......... 166/250.03 |
| 2012/0305315 A1 * | 12/2012 | Bedouet ......................... 175/50 |
| 2012/0316788 A1 * | 12/2012 | Bedouet et al. ................. 702/12 |

* cited by examiner

*Primary Examiner* — Peter Macchiarolo
*Assistant Examiner* — Nathaniel Kolb
(74) *Attorney, Agent, or Firm* — Michael A. Ervin; Krueger Iselin LLP

(57) ABSTRACT

A method for re-calibrating installed downhole sensors used in hydrocarbon wells by the application of a calibration string inserted in the wells and deployed in close proximity to the installed downhole sensor.

2 Claims, 8 Drawing Sheets

IN-SITU SYSTEM CALIBRATION

CROSS-REFERENCE TO RELATED APPLICATIONS

Not applicable.

BACKGROUND

Fiber-optic sensors are increasingly being used as devices for sensing some quantity, typically temperature or mechanical strain, but sometimes also displacements, vibrations, pressure, acceleration, rotations, or concentrations of chemical species. The general principle of such devices is that light from a laser is sent through an optical fiber and there experiences subtle changes of its parameters either in the fiber or in one or several fiber Bragg gratings and then reaches a detector arrangement which measures these changes.

The growing interest in fiber optic sensors is due to a number of inherent advantages:

Inherently safer operation (no electrical sparks)
Immunity from EMI (electromagnetic interference)
Chemical passivity (not subject to corrosion)
Wide operating temperature range (wider than most electronic devices)
Electrically insulating (can be used in high voltage environment)

Fiber optic sensors deployed in wells are predominately calibrated before being deployed down hole. After calibration such sensors are often permanently installed behind a well casing or they are attached to the down hole tubing. As downhole conditions change over time, some of these installed sensors may experience high temperatures, high pressures and various chemicals that may impact the installed sensor performance.

The sensor itself will often get calibration coefficients that are unique to the sensor, and these calibration coefficients are used in the interrogation unit to achieve desired accuracy and resolution. Many sensors must periodically be calibrated due to component drift either in the sensor itself or the interrogation unit. In some cases, it is beneficial to calibrate the sensor and the interrogation unit as a pair. Sensors permanently installed in oil & gas wells cannot be removed for calibration, and estimated annual drift requirements are applied to the sensing system.

There are economic advantages to having a method for re-calibrating such down-hole sensors. For example DTS systems are usually calibrated with each fiber during or prior to deployment. To replace a DTS system where you have up to 16 sensing fibers/wells connected would be a challenging task due to the calibration. The method proposed herein would allow in-situ calibration of the DTS system and the sensing fiber in case the DTS system or the fiber would need to be replaced.

Thus a need exists for ways to re-calibrate downhole sensing systems in-situ, without having to remove the sensors from the downhole environment.

BRIEF DESCRIPTION OF THE DRAWINGS

The foregoing issues are at least partly addressed by the disclosed by the In-Situ System Calibration as illustrated in the drawings. The drawings are not strictly to scale because the calibration strings may be only 1-2 inches in diameter while casings may be as small as 4 inches in diameter up to more than 16 inches.

DETAILED DESCRIPTION

Figure 1A:
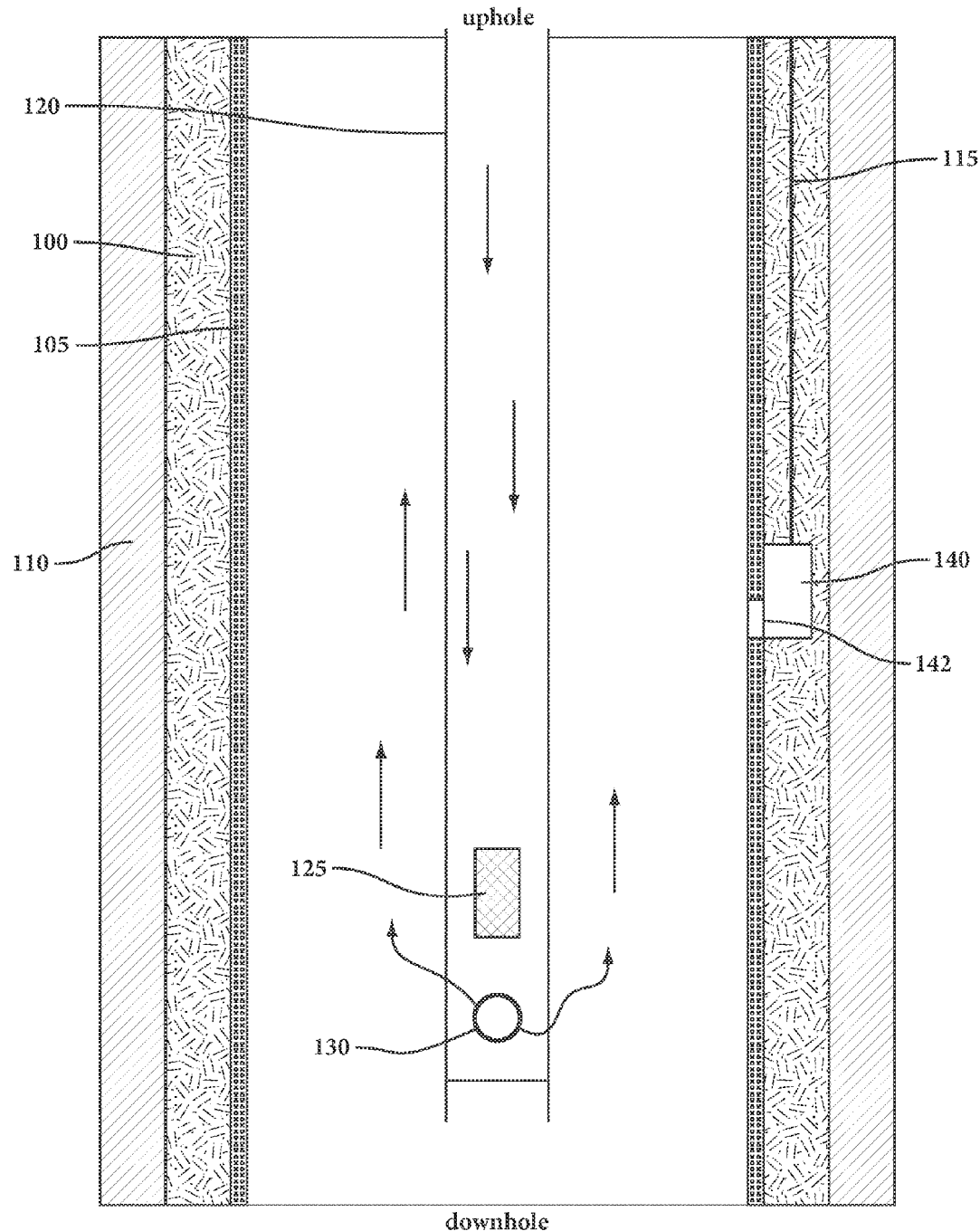
FIG. 1(a) is an illustration of a calibration string for calibration of a chemical sensor.

In the following detailed description, reference is made that illustrate embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims.

Modern fiber optic sensors are today being used in wells to sense many different parameters including at least temperature, pressure, strain, acoustic, seismic, electromagnetic, and chemical. All of these sensors are calibrated prior to installation, and permanently installed behind casing or attached to down-hole tubing. Even in ideal conditions installed sensors must periodically be calibrated due to component drift either in the sensor itself or the interrogation unit. As down-hole conditions change over time, some of these installed sensors may experience high temperatures, high pressures and various chemicals that may impact the sensor performance and increase the need for re-calibration.

In the description to follow a method is proposed to re-calibrate in-situ installed sensors by in each case inserting in-situ recalibration devices which are usually calibration strings associated with the particular installed sensors and inserted in the well close to those sensors. The calibration string can be permanently installed in the well, or it can be inserted for a temporary logging operation. For each type of sensing system to be described the calibration string is specifically associated with the installed sensor system. The embodiments will be described in a series of examples. The term calibration string, as used in this description might be an inserted tube, such as a coiled tube, that encloses the recalibration apparatus needed to recalibrate the particular sensor that is installed in the well and may need occasional recalibration. The term recalibration string can also be a mechanical structure inserted downhole without need of any tubing.

EXAMPLE 1

A chemical installed sensor is commonly impacted by repeated exposure to down-hole chemicals such as for example wax, asphaltene or other chemical commonly present down hole. These chemicals may build up layers on top of the installed sensor element. A layer of wax may change the performance of the sensor and in effect take the installed sensor out of calibration.

For the chemical sensor system the calibration string may be an inserted tubing. It can be equipped with one or several reference chemical(s) that may be released down hole from the calibration string and the system in order to re-calibrate the installed chemical sensor. If the readings are off, a cleaning solution can be released to remove wax, asphaltene and/or other chemicals that may foul the chemical sensing interface and the calibration routine can be repeated.

A chemical calibration string in a simple configuration is shown in FIG. 1(a). A casing string 105, often backed by cement 100, is shown inside a formation 110. A permanently installed sensor 140 is shown with a line 115 carrying electrical or optical connectors running uphole to the surface. A small opening 142 in the casing allows communication of the production fluids in the casing with the permanently installed sensor. In this embodiment the calibration string 120 is placed into the casing in close proximity to permanently installed sensor 140 and may have one injection point 130 to allow injection of fluid in the well bore. In operation a known fluid is injected to clean the permanently installed sensor, and the cleaning fluid is allowed to mix with the production fluids. A second calibration liquid is then injected down the calibration bore to calibrate the permanently installed sensors. The calibration string may also have a reference chemical sensor 125 connected (not shown) back to the surface.

Figure 1B:
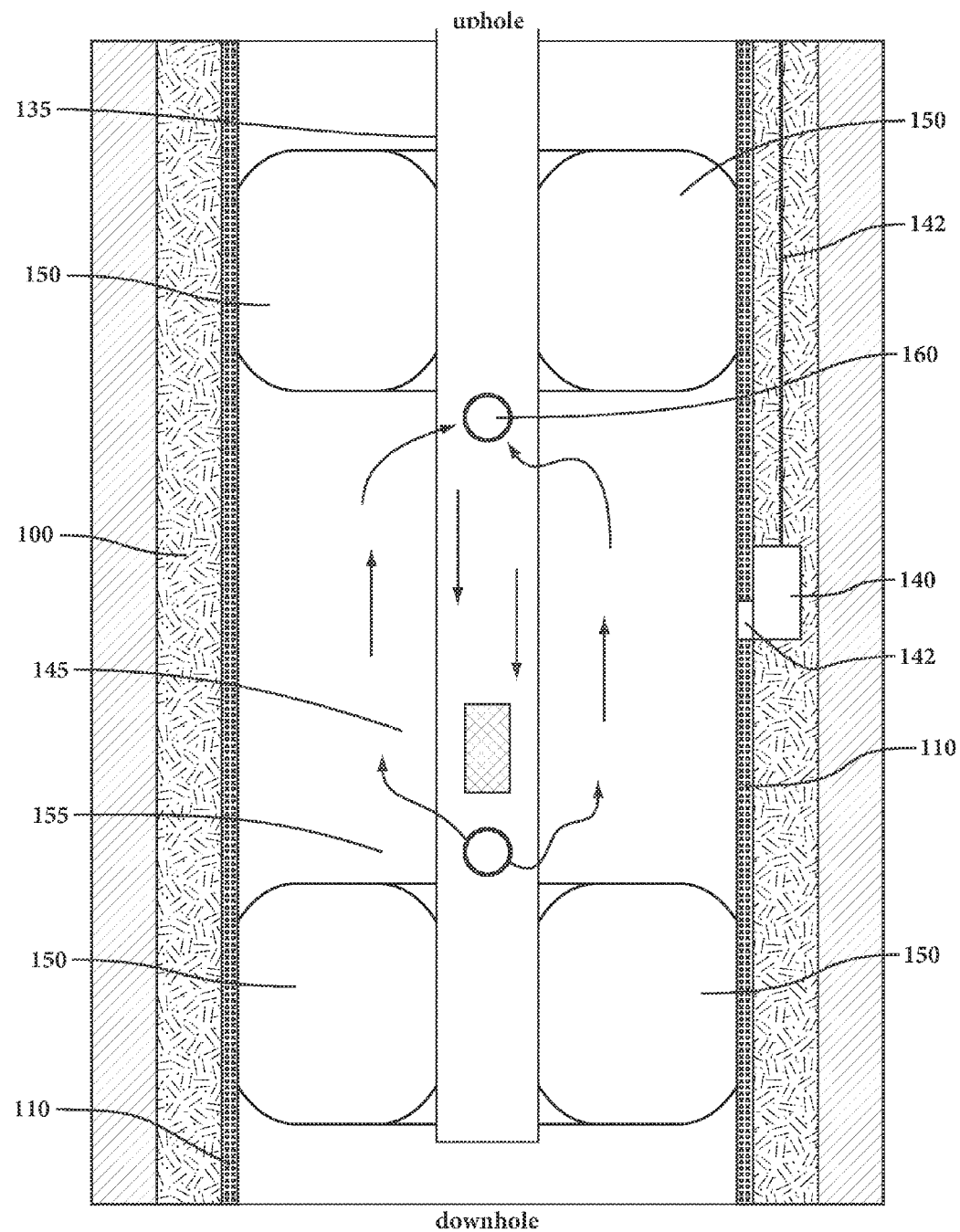
FIG. 1(b) is an illustration of an alternate embodiment of a calibration string for calibration of a chemical sensor.

A more precise calibration string may have packers 150 surrounding a calibration string 135 that may be inflated on demand, as shown in FIG. 1(b). In this embodiment the calibration string 135 is shown positioned inside of a casing 110 usually lined with cement 100 and with inflatable packers 150 on each side of the region in which the permanently installed chemical sensor 140 is located. The permanent sensor 140 may be deployed behind casing and may be cemented in place. A small opening 142 in the casing allows communication of the production fluids in the casing with the permanently installed sensor. In this embodiment calibration string 135 may also have more than one port to allow fluid circulation from a first port 155 to a second port 160. There may be one 145 or possibly more reference chemical sensors in the calibration string, connected (not shown) back to the surface. One way of operating the calibration string is to inflate 2 packers, one above and one below the fluid ports and the reference sensor(s). Each of the ports 155 and 160 may have individual lines (not shown) running back to the surface within calibration string 135 in order to feed and retrieve the fluids to the desired area between packers 150. Cleaning and calibration fluid can now be circulated between the fluid ports as required to clean and calibrate the sensors. The packers can then be deflated and the calibration string can be moved to a different location.

The calibration string may have two packers and one fluid injection port. The lower packer is then inflated and cleaning fluid is pumped so that the fluid passes the permanently installed sensor and cleans it. Calibrated fluid can then be pumped and the second packer can be set once a selected volume has been pumped into the area. The calibration fluid is now trapped between the packers and both the permanently installed chemical sensor and the reference sensor in the calibration string will be exposed to a fluid with the same chemical concentration.

EXAMPLE 2

A strain sensing fiber must be coupled to the measurement object for accurate measurements, and the sensing fiber must be protected to avoid mechanical damage. This is normally achieved by cabling the sensing fiber in a manner that the any strain in the cable is communicated into the optical sensing fiber. The sensing cable is then coupled to the measurement object by welding a sensing cable to a structure, or gluing the sensing cable to a structure, or by cementing the sensing cable in place. The sensing fiber must be coupled to the sensing cable for accurate measurements, and there may be creep between the sensing cable and sensing fiber or creep between the sensing cable and the measurement object. The creep depends on many different factors like e.g. material selection, temperature, amount of strain the sensing configuration is exposed to and this may change over time. A strain sensor may experience significant mechanical exposure during installation due to challenging well bore conditions, and this may take the sensor out of calibration over time due to e.g. creep as the tubing and/or casing may be left in tension, torsion or compression.

Figure 2:
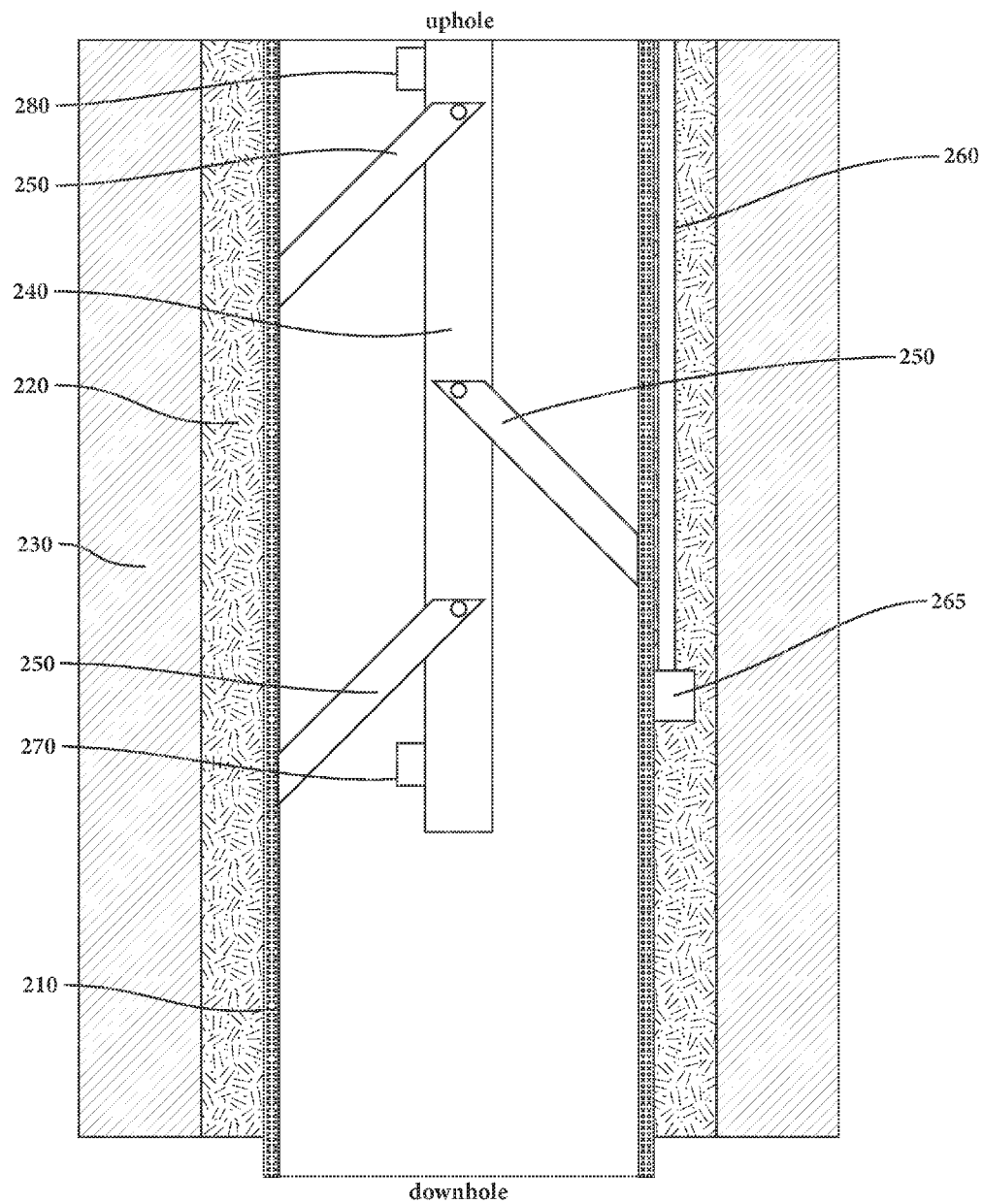
FIG. 2 is an illustration of a calibration string for calibration of a strain sensor.

For a strain sensor a mechanical system that can apply a characteristic strain signature on one or several down-hole points can be used to calibrate a strain sensing system. FIG. 2 shows such an embodiment. A casing string 210 backed by cement 220 is shown inside the formation 230. A calibration string 240, comprising a central arm, may have one or several moveable arms 250 that extends out from the calibration string and push against the walls of casing or tubing 210. Both the casing and tubing may deform as the mechanical arms push out onto the wall of the measurement object. As the casing or tubing deforms, the resulting strain is captured with the permanently installed strain sensor 260, which is cemented behind casing 210. There could also be a single point strain sensor 265 deployed. The calibration string may have a strain sensing system embedded in the tool or there may be point sensors in the string to measure resulting strain on the tool. The system may have pressure pads 270, 280 on the opposing side of the moveable arm to generate a characteristic strain signature, and these pads may be used instead of multiple moveable arms. The calibration string may also include force-measuring pads on or in close proximity of the moveable arms so that a strain can be calculated given that the casing and tubing dimensions are well known in the well.

EXAMPLE 3

Figure 3:
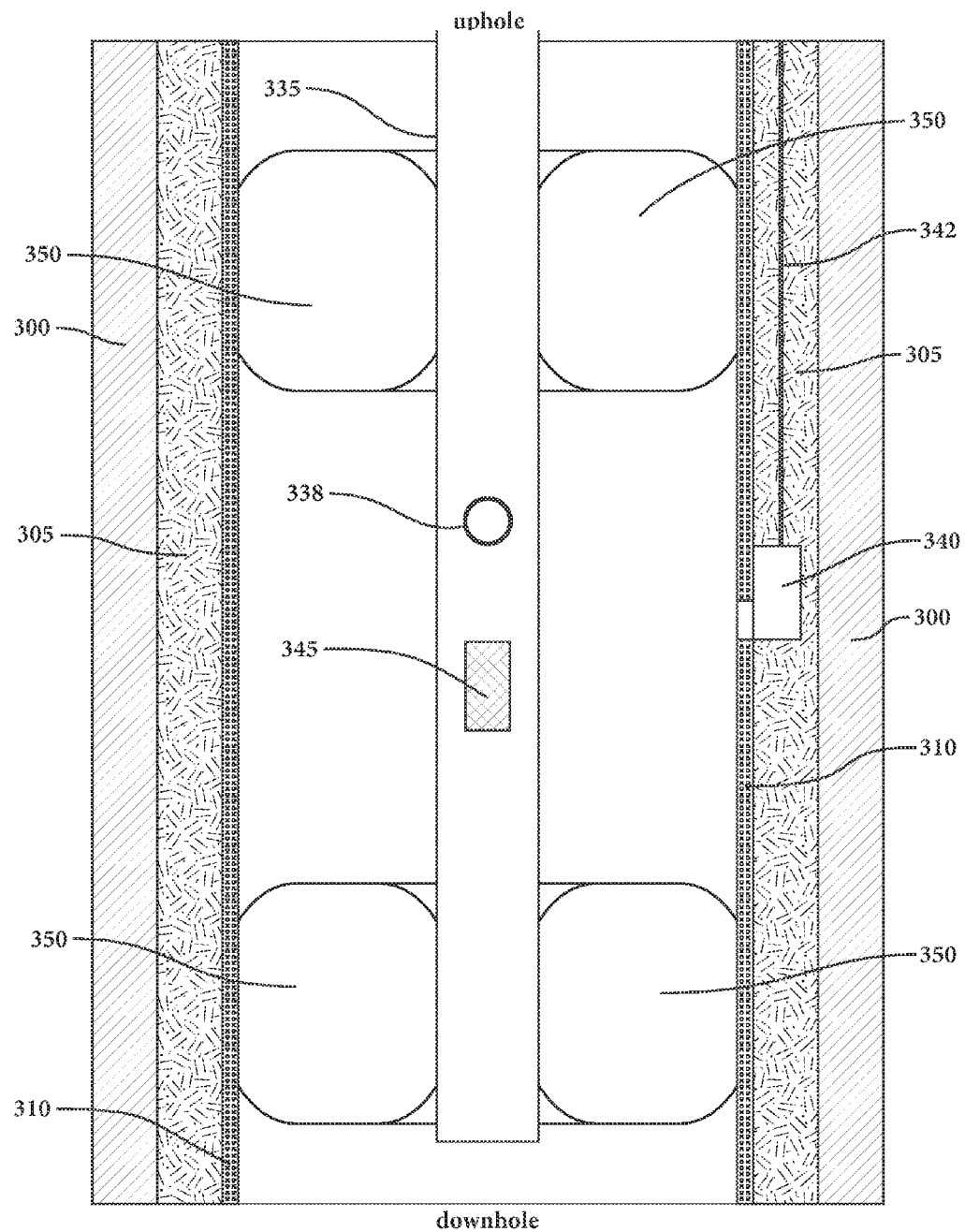
FIG. 3 is an illustration of a calibration string for calibration of a pressure sensor.

A fiber optic pressure installed sensor may experience creep between the sensing fiber and the mechanical structure that converts pressure to an optical property that can be sensed, and this creep may take the installed sensor out of calibration. The single point fiber optic pressure sensor of FIG. 3 may be installed behind the casing and have a pressure port to communicate pressure from inside the wellbore to the sensor. As shown in FIG. 3 a permanently installed sensor 340 with electrical or optical conductors 342 is shown behind casing 310 and is normally attached to the measurement object by e.g. mechanical coupling, glued, welded or cemented 305 in place along the length of the tubular downhole structure 310 such that any movement of the tubular structure is coupled to the sensor.

This re-calibration can be done as follows. A calibration string 335 with a pressure sensing system 345 using multiple packers 350 can be used to isolate a zone where a permanently installed pressure sensor 340 is installed. The packer(s) can be used to isolate the zone, and the formation pressure can be used as a calibration pressure and a comparison can be made between the permanently installed sensor 340 and the reference pressure sensor 345 in the calibration string. The calibration string may have means of applying a controlled pressure as well by applying pressure via an opening 338 in the calibration string between the packers.

A simple calibration string can be used without any packers if formation pressure or tubing/casing pressure is used for calibration. Depth correlation is normally done by measuring the length of calibration string that has been lowered in the well. A more accurate depth calibration can be done using permanently deployed DTS and/or DAS combined with thermal and/or acoustic events in the calibration string. An example of a thermal event could be electrical heaters, fluid injection in the calibration string where a difference in temperature is detected using the permanently deployed DTS system. Examples of acoustic events could be a battery operated device emitting a tone of a certain frequency, and the location would be measured as the peak location of the acoustic amplitude of the tone.

EXAMPLE 4

A Distributed Temperature Sensing (DTS) system may have fiber-aging down-hole due to temperature and/or chemical exposure causing inaccuracies in the measurements. This effect can largely be mitigated in Distributed Temperature Sensing (DTS) systems using dual laser technology, but re-calibration can in some cases improve the accuracy of temperature readings.

This re-calibration can be done as follows. A calibration string with means of measure temperature accurate can be inserted into the wellbore for comparison between the permanently installed sensor and the reference sensor. The calibration string may have means of changing the down-hole temperature both for depth calibration purposes and for temperature calibration purposes. The temperature change can be made using electrical, chemical or mechanical means like inserting fluid and/or steam through a conduit in the calibration string. The calibration string could be a well-calibrated optical fiber sensor pumped into a conduit, or a small OD cable with optical fibers present. The calibration string can also be a stiff cable that can be pushed into a conduit or well. The reference sensor in the calibration string can be electrical (thermo-couples etc.) or optical, and optical configurations include e.g. distributed temperature sensing systems based on Raman, Rayleigh or Brillouin effects, and/or single point sensors based on FBG sensors, Fabry-Perot sensors or other means of measuring temperature.

Figure 4:
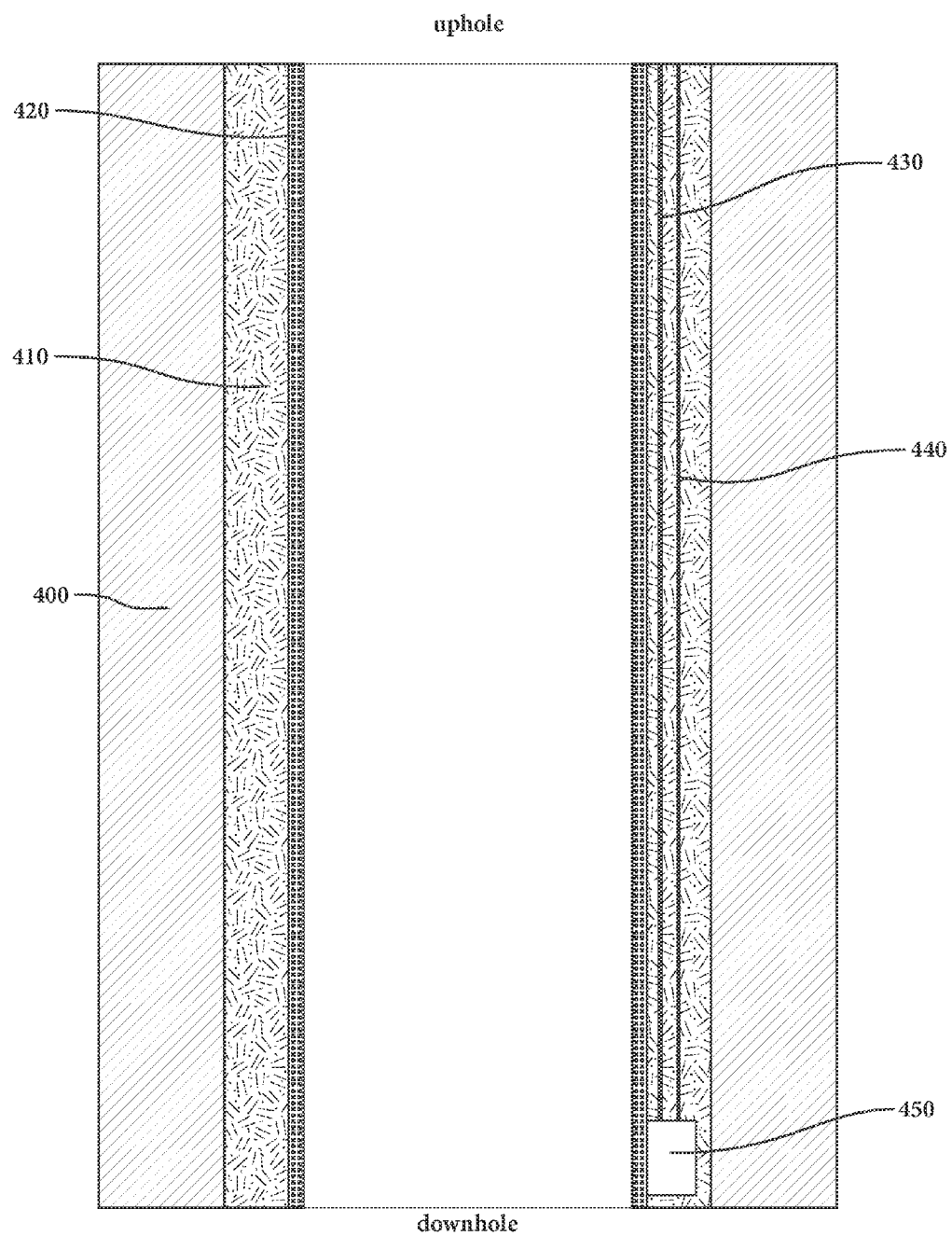
FIG. 4 is an illustration of a double ended conduit with a permanently installed optical fiber. The calibration string for calibration of a Distributed Temperature Sensing (DTS) sensor may be inserted in the right side tube (440).

An embodiment for doing this is illustrated in FIG. 4, which utilizes a technique used in DTS installations in Steam Assisted Gravity Drainage wells used in the Canadian oil sands operations where it is common to pump optical fibers into conduits for temperature sensing. A conduit 430 (often ¼" metal tubes) is shown deployed in a double ended configuration. The fluid flow goes down hole in conduit 430 usually to the bottom of the well where a Turn-Around-Sub (TAS) 450 is installed, and the fluid comes up the other conduit 440. The optical fiber, which becomes the permanently installed sensor, is deployed in the fluid flow and the distributed forces acting on the fiber and drags into the conduit. The fiber can either be deployed in a single ended fashion where the fiber stops at TAS 450, or it can be pumped all the way to the surface in a double-ended configuration. A second fiber can be pumped in on top of the first fiber, although it is more challenging to get the second fiber to full depth. The second fiber can be used as a calibration string, either as a distributed system or with single point sensors suitably attached to the cable. The calibration string can also be a stiff cable with thermo-couples and/or optical fibers for distributed and/or point temperature sensors. The stiff cable can be pushed into the return conduit 440 in the case of a single ended installation. This method uses a reference sensor in the cable, and the calibration is done to the well bore temperature. Different temperatures may occur during steam injection and when the well is put on production, and the variation over temperature can be used to achieve a solid calibration.

EXAMPLE 5

A Distributed Acoustic Sensing (DAS) system may have different coupling between the fiber and the formation due to e.g. cement around the sensing cable. The acoustic amplitude may vary, and it may be advantageous to have a better understanding of where you have good coupling to the formation and where there may be less coupling and therefore lower signals.

Figure 5:
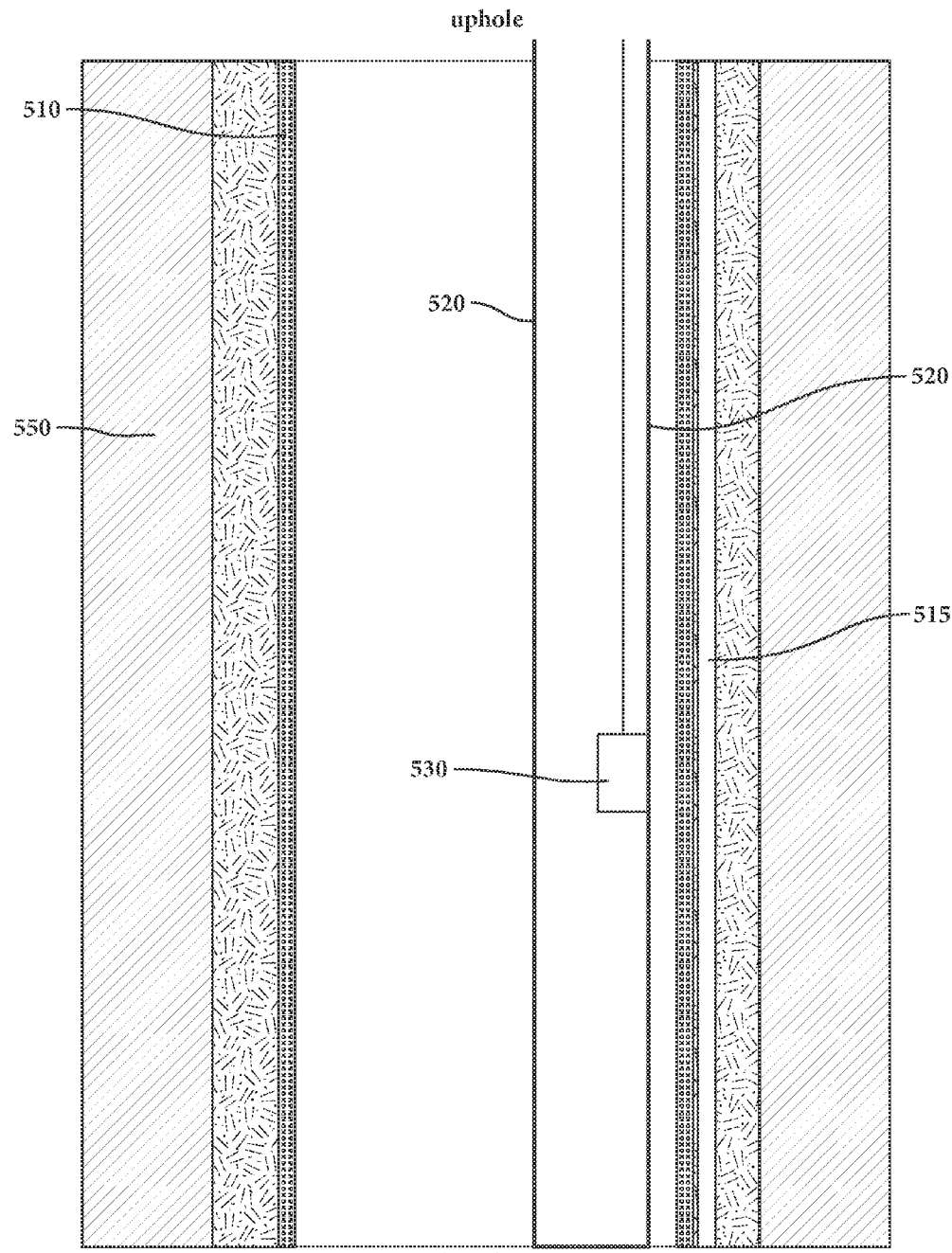
FIG. 5 is an illustration of a calibration string for calibration of a Distributed Acoustic Sensing (DAS) sensor.

This re-calibration can be done as follows. As shown in FIG. 5, a calibration string 520 can be deployed into the well bore within casing 510 in close proximity to the permanently installed DAS system 515. The DAS sensing cable 515 may be permanently cemented in place between the casing 510 and the formation 550, and normally run to the bottom of the well. Calibration string 520 can be equipped with a calibrated noisemaker 530 and can be inserted in the well and used to apply a characteristic acoustic signature on one or several downhole points in close proximity to installed sensor 515 and thereby log the acoustic signature of the DAS system. A thermal point event can also be used for depth calibration purposes when there is a DTS system present in the same sensing cable as the DAS fiber.

EXAMPLE 6

Seismic sensors may be permanently installed in a well, and cemented in place behind casing, or attached to tubing where coupling to the well is done mechanically or magnetically. It is however impossible to know how well the installed sensor is coupled to the formation, and the seismic signal amplitude is directly proportional to how well the installed sensor is coupled to the formation. Seismic sensors may also have moving parts and the orientation may be un-known.

Figure 6:
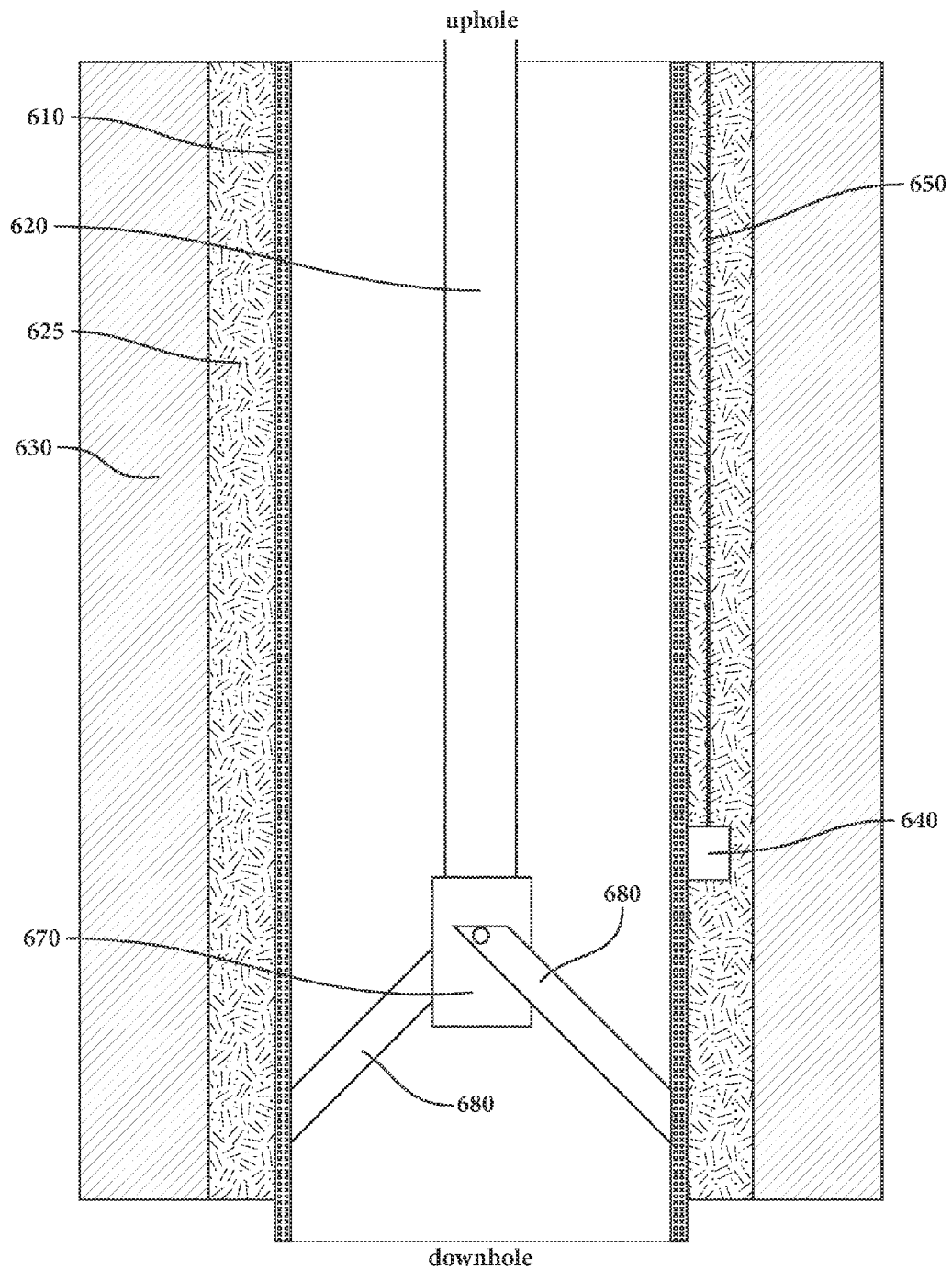
FIG. 6 is an illustration of a calibration string for calibration of a seismic sensor.

This re-calibration can be done as follows. Referring to FIG. 6 representing a formation 630 a permanently installed seismic sensor 640 is attached to the outside of casing 610, possibly in a cement 625 matrix, with communication back to the surface via tubing 650. A calibration string 620 with a vibration source 670 can be inserted in the well and located in close proximity of the permanently installed seismic sensor 640. The calibration string may have mechanical coupling to the tubular structure where the seismic sensors are located. Examples of mechanical coupling could be a spring-loaded locking arm, a mechanical packer, or a bow-spring type device that mechanically couples the calibration string with the tubular structure where the seismic sensors are located. As shown in FIG. 6 the mechanically coupling is accomplished via locking arm 680, pressed against the casing or tubing 610. The vibration of vibration source 670 will allow calibration and health check of the fiber optic seismic sensors and can also be used to verify sensor orientation assuming the calibration string is properly equipped.

The calibration string may be designed to couple both shear and pressure waves through a mechanical arm or other mechanical coupling device or the calibration string may sit in a fluid without mechanical coupling where pressure waves are mainly used for calibration purposes.

EXAMPLE 7

An electromagnetic sensing system can be permanently installed in a well.

Figure 7:
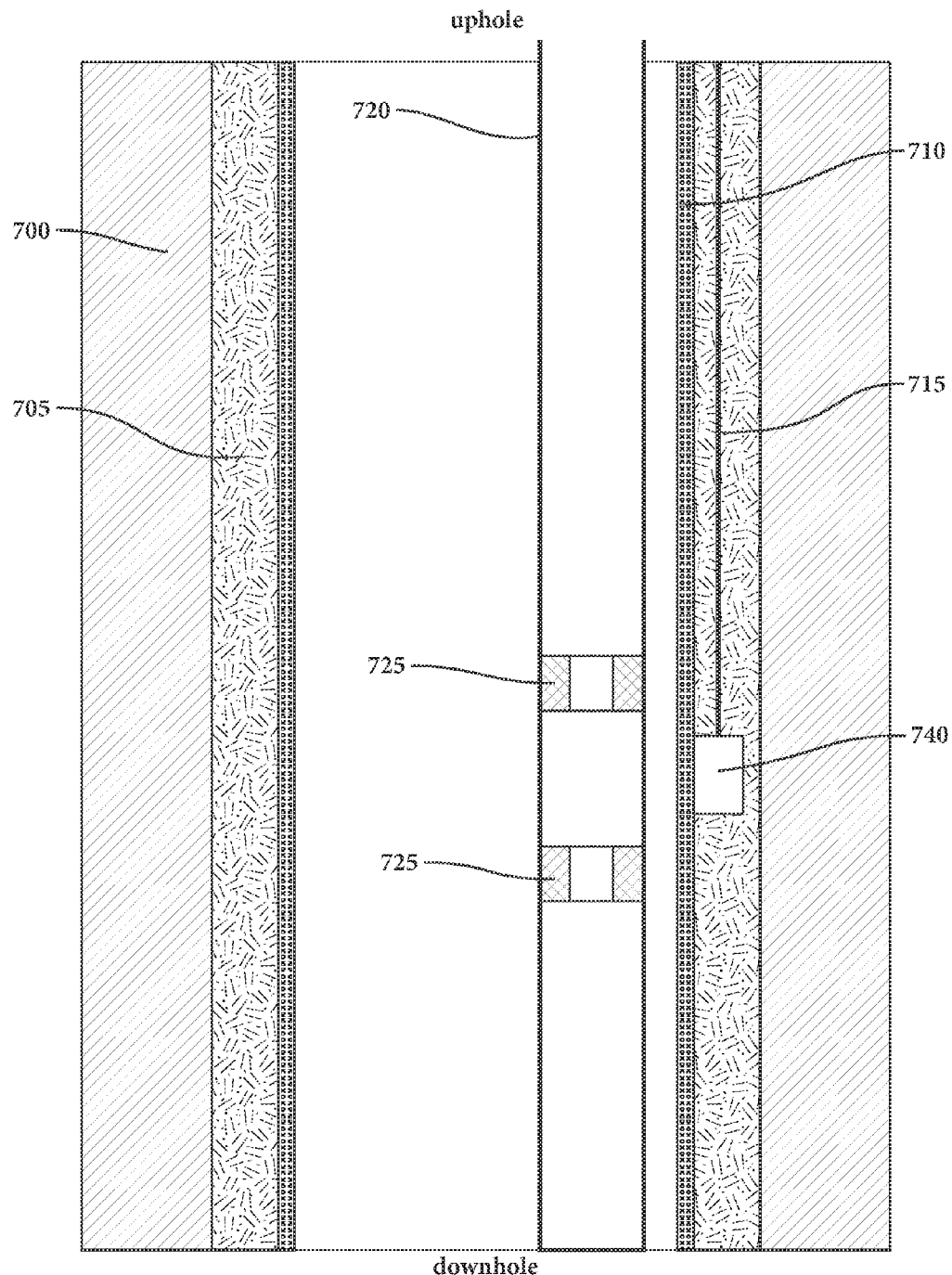
FIG. 7 is an illustration of a calibration string for calibration of an electromagnetic sensing sensor.

A calibration string can be inserted in the well in close proximity to the installed electromagnetic sensing system that contains small permanent magnets or electrical coils that can be used to generate a characteristic magnetic field signature. The calibration string can then be used for calibration and health check of the installed electromagnetic sensing system. FIG. 7 illustrates such a system. A well casing 710, possibly backed up by a layer of cement 705 lies within the formation 700. A calibration string 720 has been installed inside well casing 710 near a permanently installed electromagnetic sensing system 740, which is in communication with the surface via cable 715. The permanently installed electromagnetic sensing system 740 may be in cement 705 behind the casing. The calibration string 720 has installed either small permanent magnets or electrical coils 725. These are used to generate a characteristic magnetic signature and electromagnetic sensor 710 can be calibrated against that.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

I claim:

1. A downhole in-situ recalibration device for use in re-calibrating an installed downhole sensor comprising:
   a. a downhole calibration string associated with pressure sensing;
   b. wherein said installed sense is a pressure sensor and said calibration string contains a pressure sensing system with multiple packers that are used to isolate a zone where the sensor to be recalibrated is installed;
   c. wherein a known pressure with the zone where the installed pressure sensor to be recalibrated is installed is used as calibration pressure and the installed pressure sensor is calibrated against the know pressure measured by the pressure sensing system of the calibration string
   d. wherein the known pressure is a controlled pressure applied from the calibration string via an opening in the calibration string into the zone between the packers.

2. A method for in-situ recalibration of an installed pressure sensor in a downhole sensing system in hydrocarbon wells comprising the steps of:
   a. inserting a calibration string associated with pressure sensing in the hydrocarbon well in close proximity to said installed sensor;
   b. wherein said calibration string contains a pressure sensing system with multiple packers that are used to isolate a zone where the installed pressure sensor to be recalibrated is installed;
   c. wherein a known pressure within the zone where the installed pressure sensor to be recalibrated is installed is used as a calibration pressure and the installed pressure sensor is recalibrated against the known pressure measured by the pressure sensing system of the calibration string
   d. wherein the known pressure is a controlled pressure applied from the calibration string via an opening in the calibration string into the zone between the packers.

* * * * *

UNITED STATES PATENT AND TRADEMARK OFFICE
CERTIFICATE OF CORRECTION

| | | |
|---|---|---|
| PATENT NO. | : 9,121,972 B2 | Page 1 of 1 |
| APPLICATION NO. | : 13/751056 | |
| DATED | : September 1, 2015 | |
| INVENTOR(S) | : Mikko Jaaskelainen | |

It is certified that error appears in the above-identified patent and that said Letters Patent is hereby corrected as shown below:

Claims

Column 8, line 6, In Claim 1, element b. the issued patent says:

"b. wherein said installed sense is a pressure sensor......"

and should read:

"b. wherein said installed sensor is a pressure sensor......"

Signed and Sealed this
Ninth Day of February, 2016

Michelle K. Lee
*Director of the United States Patent and Trademark Office*